(12) United States Patent
Giglia et al.

(10) Patent No.: US 6,740,140 B2
(45) Date of Patent: May 25, 2004

(54) HOLLOW FIBER MEMBRANE SYSTEM ASSEMBLY WITH AN INTERNAL REFLUX SYSTEM

(75) Inventors: Salvatore Giglia, Norwood, MA (US); Bradley Quinn Johnson, Lakeville, MA (US); Benjamin Bikson, Brookline, MA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/947,366

(22) Filed: Sep. 7, 2001

(65) Prior Publication Data

US 2003/0047077 A1 Mar. 13, 2003

(51) Int. Cl.$^7$ .......................... B01D 53/22; B01D 63/02
(52) U.S. Cl. .......................... 95/52; 95/45; 96/8; 96/10
(58) Field of Search ...................... 95/45–56, 4, 8, 95/10; 96/4, 8, 10; 210/321.8, 321.89

(56) References Cited

U.S. PATENT DOCUMENTS

| | | | | |
|---|---|---|---|---|
| 3,499,062 A | * | 3/1970 | Geary, Jr. et al. | |
| 3,735,558 A | * | 5/1973 | Skarstrom et al. | 95/52 X |
| 4,718,921 A | * | 1/1988 | Makino et al. | |
| 4,808,199 A | * | 2/1989 | Yearout | 96/10 X |
| 4,881,955 A | * | 11/1989 | Bikson et al. | |
| 5,026,479 A | * | 6/1991 | Bikson et al. | |
| 5,108,464 A | * | 4/1992 | Friesen et al. | |
| 5,160,514 A | * | 11/1992 | Newbold et al. | |
| 5,411,662 A | * | 5/1995 | Nicolas, Jr. et al. | |
| 5,525,143 A | * | 6/1996 | Morgan et al. | |
| 5,605,564 A | * | 2/1997 | Collins | 95/52 |
| 5,702,601 A | * | 12/1997 | Bikson et al. | |
| 5,961,692 A | * | 10/1999 | Collins | 95/52 X |
| 6,004,383 A | * | 12/1999 | Kuhnelt | |
| 6,296,683 B1 | * | 10/2001 | Koch | 95/52 X |
| 6,370,887 B1 | * | 4/2002 | Hachimaki | 96/8 X |
| 2002/0069758 A1 | * | 6/2002 | Burban et al. | 96/8 |

FOREIGN PATENT DOCUMENTS

| | | | |
|---|---|---|---|
| JP | 01-063020 A | * | 3/1989 |
| JP | 01-199623 A | * | 8/1989 |
| JP | 02-135117 A | * | 5/1990 |
| JP | 06-134244 A | * | 5/1994 |
| JP | 06-134245 A | * | 5/1994 |
| JP | 06-134246 A | * | 5/1994 |
| WO | WO 91/11249 A | * | 8/1991 |

\* cited by examiner

Primary Examiner—Robert H. Spitzer
(74) Attorney, Agent, or Firm—David M. Rosenblum

(57) ABSTRACT

The present invention provides a hollow fiber membrane gas separation assembly having an integral purge control aperture or purge reflux system which is internal to the hollow fiber apparatus. The assembly is particularly useful for separating water vapor from a gas stream.

22 Claims, 4 Drawing Sheets

HOLLOW FIBER MEMBRANE SYSTEM ASSEMBLY WITH AN INTERNAL REFLUX SYSTEM

FIELD OF THE INVENTION

The present invention relates to a gas separation assembly and membrane gas separation processes wherein the assembly is comprised of hollow fiber membranes capable of selectively permeating one component of fluid mixture over other components. More particularly, the invention relates to a membrane gas separation assembly which provides an internal countercurrent sweep and processes that utilize this assembly.

BACKGROUND OF THE INVENTION

It is known in the art to use various hollow fiber membrane gas separation devices for separating gas mixtures. Normally, these separation devices are designed so that the gas mixture can be brought into contact with the hollow fiber membrane therein under a partial pressure differential one or more highly permeable components of the fluid mixture are being separated from the less permeable components. The hollow fiber membrane allows the more readily permeable component of the fluid mixture to permeate into the permeate side of the hollow fiber membrane while retaining a substantial portion of the less readily permeable component of the fluid mixture on the non-permeate side of the hollow fiber membrane. The permeated and non-permeated components are removed through or recovered from at least one permeate outlet and at least one non-permeate outlet, respectively.

In some instances the membrane gas separation devices, (assemblies) are designed to provide a purge or a sweep gas on the permeate side of the membrane. The use of a sweep gas on the permeate side of the membrane is beneficial in certain gas separation processes, such as gas dehydration processes, since it decreases the permeate side partial pressure of the more highly permeable component thus allowing the gas mixture to be more thoroughly stripped of the more readily permeable component. The sweep gas is typically flown counter currently to the direction of the feed—non-permeate flow. The use of a dry sweep gas can improve the product gas dryness as well as the productivity of the membrane device. A portion of the dry product gas is frequently utilized as the sweep gas generating an internal reflux system.

The gas separation assembly that provides for sweep or purge gas introduction generally comprises an annular hollow fiber membrane bundle in an enclosure or a shell having a fluid feed inlet, a non-permeate outlet, a permeate outlet and a sweep or purge gas inlet. Examples of such membrane assemblies can be found in U.S. Pat. Nos. 3,499,062, 4,718,921, 5,108,464 and 5,026,479. These fluid separation devices, however, require external plumbing and valves to regulate the flow of the sweep gas to be fed to the sweep gas inlet port. In some gas separation applications, such as gas drying, a portion of the non-permeate product (the dry gas) is used as the sweep gas. The need to manifold the dry sweep gas external to the gas separation apparatus adds to the size and the complexity of the device.

Several attempts have been made to provide an internal sweep gas arrangement and an internal sweep gas flow control. U.S. Pat. Nos. 5,411,662 and 5,525,143 disclose such integral hollow fiber devices.

The hollow fiber membrane assemblies with integral internal purge arrangements, however, can have a number of disadvantages. The purge flow does not shut down automatically when the product (non-permeate) gas is not being withdrawn from the device. The feed flow to the assembly must be shut down or a valve on the purge flow line must be installed and closed to prevent a continuous loss of the feed gas through the purge conduit. Furthermore, the purge flow will remain constant irrespective of product draw or the required product dew point. Several attempts have been made to regulate the purge flow rate according to the feed or product flow rates or the level of product dryness required. Examples can be found in U.S. Pat. Nos. 5,160,514, 6,006,383 and the U.S. Pat. No. 5,411,662 referenced above and in JP09057043. However, these designs are complicated and difficult to implement. Thus, there still remains a need in the field for an improved hollow fiber gas separation assembly with internal reflux system.

Accordingly, it is an object of the invention to provide means by which the operation of the gas separation apparatus equipped with a reflux system can be carried out without external plumbing and valves. It is another object of the invention to provide means by which the gas separation apparatus having a purging means can be easily implemented and operated. It is a further object of this invention to provide a means to reduce gas losses through the purge gas conduit when the membrane separation assembly is not in operation. It is a further object of the present invention to provide a means to adjust the volume of the purge flow according to the amount of non-permeate gas withdrawn without the need for external intervention, outside energy sources or complicated peripheral devices.

SUMMARY OF THE INVENTION

The present invention provides a hallow fiber membrane gas separation assembly having a counter current sweep on the permeate side of the hollow fibers with a portion of the product gas wherein the sweep gas is introduced internally to the assembly. The assembly is comprised of an elongated casing or shell having a feed gas inlet and permeate and product gas outlets. The outlets are positioned essentially at the same end of the casing, and the feed inlet is appropriately located between the tubesheets. The casing encloses a multiplicity of hollow fiber membranes positioned around an inner, tubular core member. The hollow fibers extend between two tubesheets, each end of hollow fibers terminating in a tubesheet and being opened to allow unobstructed gas flow into and out of the hollow fiber bores. Means such as O-rings to secure and seal tubesheets to the casing in fluid tight relationship are further provided. The ends of the tubular core member are open through the ends of the tubesheets. The assembly is provided with at least one purge flow control orifice positioned in the tubular core member that directs predetermined amount of the product gas into the bores as a counter current sweep. According to one embodiment of the present invention an on-off valve is positioned in the tubular core member that substantially shuts off the flow of the purge gas when the product gas is not withdrawn from the assembly.

According to another embodiment of the present invention a purge flow control valve is positioned in the tubular core member that regulates the volume of the purge gas in proportion to the amount of product gas withdrawn from the assembly.

The invention further provides for gas dehydration processes that utilize the disclosed novel gas separation apparatuses. The gas dehydration processes of this invention are designed to remove predetermined amounts of the water vapor contained in the feed gas wherein the amount of sweep gas utilized to purge the permeate side of hollow fiber membranes is minimized. The sweep gas flow is generally from about 1% to about 80%, preferably from 5% to about 60%, of the net flow rate of the dehydrated product gas.

DETAILED DESCRIPTION OF THE INVENTION

Figure 1:
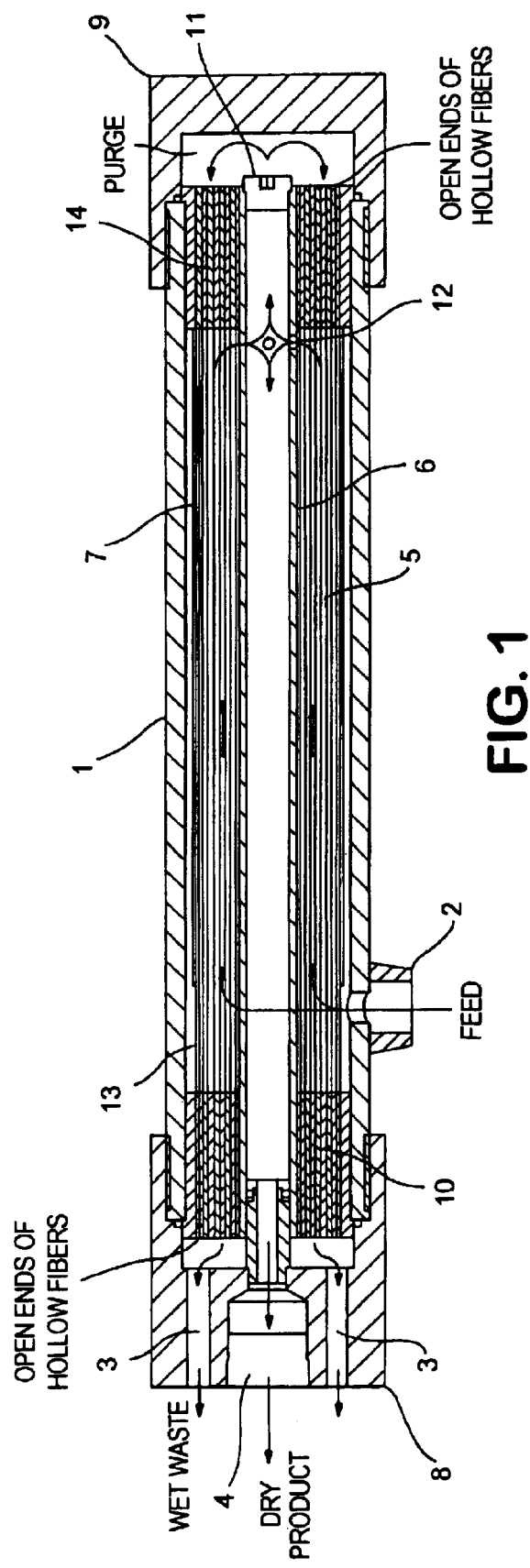
FIG. 1 is a sectional view of a shell side feed gas separation device having an internal purge control valve in accordance with one embodiment of the present invention.

In FIG. 1 there is illustrated a sectional view of one preferred gas separation assembly. In this embodiment the gas is introduced to the shell side, i.e. the exterior of hollow fiber membranes. The fluid separation assembly comprises a casing (1) having at least one feed gas inlet (2) and at least one combined permeate and sweep gas outlet (3) and at least one dry product gas outlet (4) surrounding an annular hollow fiber membrane bundle (5). A novel feature of the present invention is that the permeate and product gas outlets (ports) are located essentially at the same end of the casing while the counter current flow configuration between the permeate/sweep and product/feed gas streams is still maintained.

The casing is an enclosure or a pressure shell that can be made of a metal, a plastic or other appropriate material. The casing (1) contains two end caps (8 and 9) sealed to the bundle (5) by means of o-rings to form a fluid tight seal. Other means of securing and sealing the hollow fiber bundle to the casing known to those in the art can also be employed. The hollow fiber bundle is uniformly arranged around a central core member (6). In one preferred embodiment the hollow fibers are wound around the central tubular core member to form a structured hollow fiber bundle. The use of wound or other structured hollow fiber configurations are well known in the art.

Examples of wound hollow fiber configurations and winding procedures can be found in U.S. Pat. Nos. 4,881,955 and 5,702,601. FIG. 1 shows a parallel, straight arrangement of hollow fibers. Both ends of the hollow fiber bundle are encapsulated in tubesheets (10, 14) with both ends of the inner core member opening out through the ends of the tubesheets. The inner core member (6) may be an elongated tube having openings (12) near one of the tubesheets (14) to permit the flow of gas between the exterior surface of the hollow fibers and the interior of the inner core member. The size, number and location of these openings are dependent upon the size of the assembly and the volume of the gas transported. In an optimal counter current flow arrangement the openings are generally situated at the point from about one percent or less to a point up to 25 percent of the longitudinal length between the two tubesheets. The opening can be in the form of holes, cut slots or other perforations. The cross-sectional area occupied by the openings is essentially determined by pressure drop requirements and is preferably kept to an acceptable minimum cross-section. The central core member can be made from any tubular material, such as metal, plastic, composite laminate and the like. The ends of each tubesheet are severed and the hollow fiber bores are opened to allow unobstructed gas flow into and out of the hollow fiber bores.

In a preferred embodiment, the exposed hollow fiber bundle between the tubesheets (10) and (14) may be encased with an essentially non-permeable film barrier (7) except for a non-encased circumferential region (13) near one of the ends of the hollow fiber bundle (5) that is located at the end opposite to the end where the openings (12) are located. A purge flow control orifice, i.e. a fluid flow aperture, (11) is installed into the end opening of the inner core member (6).

The application of the assembly for gas dehydration is further discussed below. In practice of the gas separation assembly (1) the wet gas stream is fed through the gas inlet port (2) and then through the circumferential region (13) into hollow fiber bundle (5). The gas is flown along hollow fiber membranes wherein the water vapor is stripped from the gas. The dried gas is transported through openings (12) into the inner core member (6). The dry gas is split into two unequal streams. The major portion, the dry product is transported through the inner core member to the exit port (4), while a fraction of the dry gas is directed through the purge flow control orifice (11) into hollow fiber bores. The flow control orifice (11) is sized to direct a predetermined fraction of the dry gas as the sweep. The sweep stream enriched with the wet permeate gas is discharged through outlet (3) as a wet waste gas.

Figure 2:
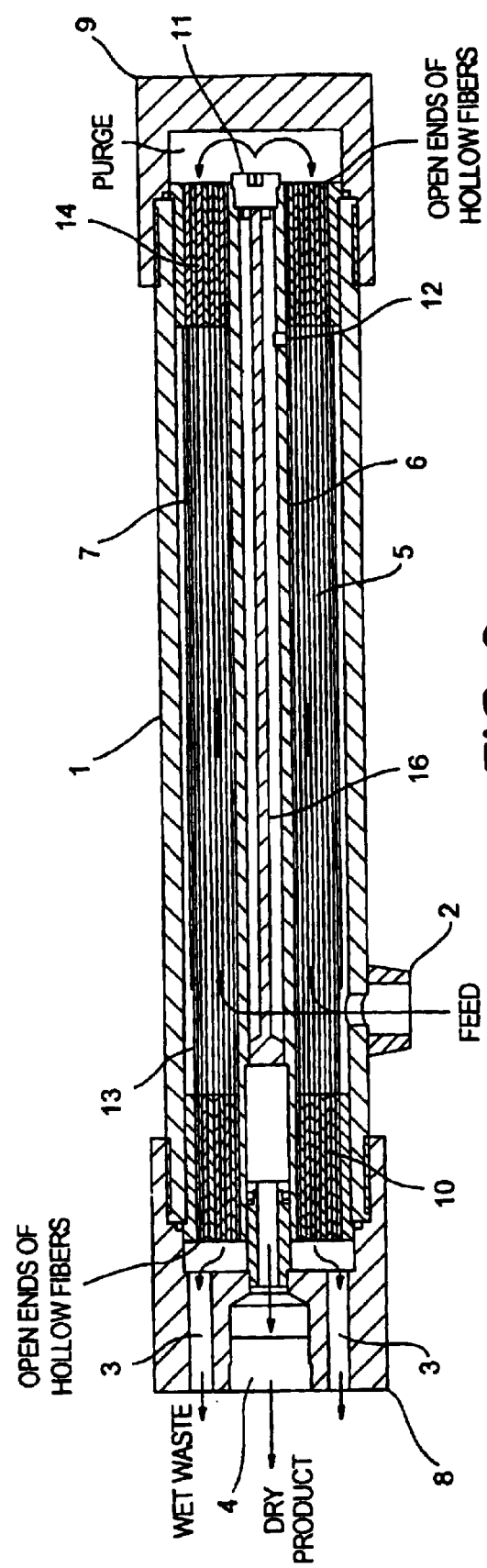
FIG. 2 is a sectional view of a shell side feed gas separation device with an on/off type internal purge control valve in accordance with another embodiment of the present invention.
Figure 3C:
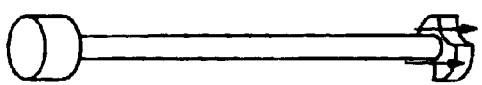
FIG. 3c is an enlarged view of a valve stem which may be used in the internal purge control valve shown in FIGS. 3a and 3b.

In FIGS. 2 through 3 a sectional view of one, preferred gas separation assembly equipped with an on-off purge flow controlling means (15) is illustrated. The fluid flow controlling means (15) comprises a valve stem (16) vertically extending through the internal core member (6) and positioned adjacent to the purge control orifice (11). The internal core member (6) forms the exterior body of the flow control means. The first end (17) of the valve stem (16) is positioned above openings (12) that provide for introduction of the dry gas into the internal conduit of the core member (6). The second end (18) of the valve stem is positioned below openings (12) that provide for introduction of the dry gas into the internal core member (6) and the purge control orifice (11). Thus the first and the second end of the valve stem are positioned in the dry product gas and the purge gas flow channels respectively.

Figure 3B:
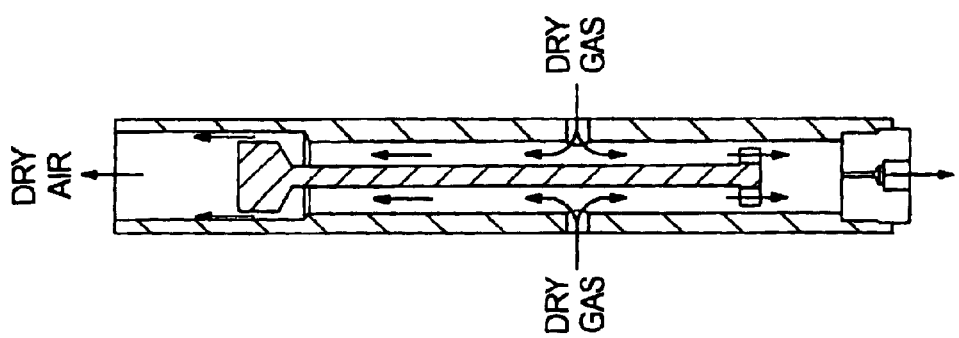
FIGS. 3a and 3b are enlarged fragmented views of the internal purge control valve of the embodiment in FIG. 2 in off and on operating positions, respectively.
Figure 3A:
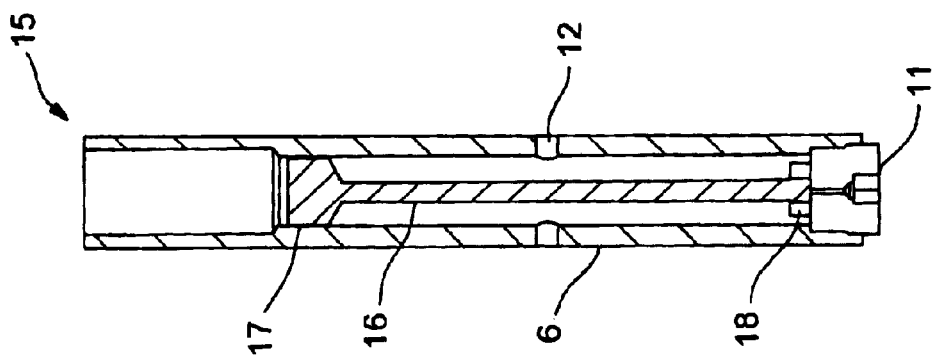

The purge control means stays open when the dry gas is utilized by the user and is drawn through the exit port (4) from the membrane drying assembly. The pressure caused by the flow of the dry gas withdrawn from the assembly lifts the valve stem to allow for the purge gas to be delivered to the purge flow control orifice as shown in FIG. 3b. The purge control means is biased by pressure so as to stay closed when the product dry gas is not withdrawn by the user. The closure can be actuated by mounting the assembly in a vertical position or by incorporating a counter spring (not shown). The counter spring provides for flexible directional mounting of the device. The second end (18) of the valve stem (16)

is designed so as to allow a small, controlled amount of bypass even when the dry gas is not withdrawn by the user and the purge flow control means is in the closed position as shown in FIG. 3a. This is necessary to allow for the valve stem to be easily lifted to open the flow control means as the dry gas is withdrawn from the device. Furthermore, the bypass flow ensures continuous purge of the water vapor as it permeates through hollow fiber membranes, therefore the membrane dryer remains continuously ready for operation. The bypass flow should preferably be less than 20 percent of the amount of the purge flow through the purge control orifice (11) generated during the continuous drying operating of the device, most preferably less than 5 percent of the amount of the purge flow.

Figure 4C:
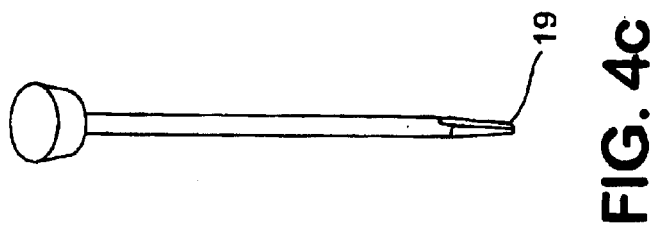
FIG. 4c is an enlarged view of a valve stem which may be used in the internal purge control valve shown in FIGS. 3a and 3b.
Figure 4B:
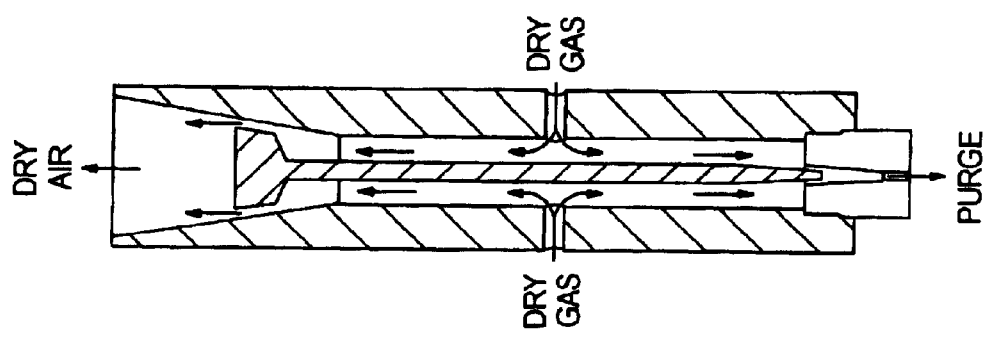
FIGS. 4a and 4b are an enlarged fragmented view of another embodiment of the present invention wherein the purge flow control means is a variable flow purge control valve shown in off and on positions, respectively.
Figure 4A:
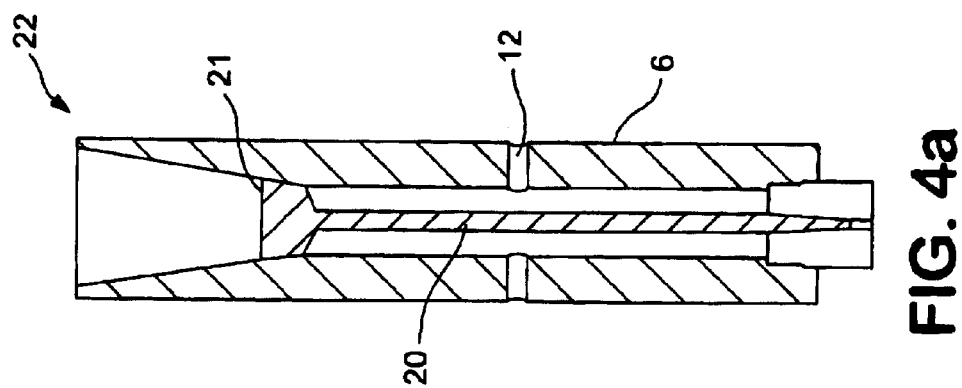

The purge control means can be further modified as shown in FIGS. 4a and 4b to provide a variable purge that is adjusted towards the amount of the product dry gas withdrawn from the device by the user. The purge control means (22) is biased so as to stay closed when the product dry gas is not withdrawn, FIG. 4a. The closure can be preferably actuated by a counter spring (not shown). The first end (21) of the valve stem (20) is designed to be moved in a direct proportion to the amount of the dry gas withdrawn from the device. The movement of the first end of the valve stem in response to the flow of dry gas generates a corresponding movement in the second end of the valve stem and a corresponding change in the amount of the purge gas. The second end (19) of the valve stem (20) is designed so as to allow a small controlled amount of bypass even when the dry gas is not withdrawn from the device as discussed above.

The use of an additional fixed purge flow orifice (11) in this embodiment is optional, and the flow of purge gas can be controlled by the variable restriction (aperture) of the second end of the valve stem.

The membrane devices of this invention are particularly useful for gas separations that utilize a fraction of the product as a purge. These processes include gas drying processes such as air drying and natural gas drying.

Although this invention has been described in detail with reference to certain embodiments, those skilled in the art will recognize that there are other embodiments of the invention within the spirit and the scope of the claims.

What is claimed is:

1. A gas separation process comprising passing a feed gas containing components that are permeable through a hollow fiber membrane, and components that are not permeable through said hollow fiber membrane, through a gas separation assembly and recovering a non-permeate product gas, wherein said assembly comprises:
   (a) a casing having an inlet for said feed gas, an outlet for said non-permeate product gas and an outlet for said permeate gas;
   (b) a multiplicity of said hollow fiber membranes having permeate and non-permeate sides arranged longitudinally in said casing, the lumens of said hollow fiber membranes being in fluid communication with the permeate gas outlet and the nonpermeate product gas outlet, and the outside of said hollow fiber membranes being in fluid communication with said feed gas inlet, said hollow fibers being positioned in the casing extending from a first tubesheet near the product gas outlet to a second tubesheet at the opposite end of said casing;
   (c) an inner core member surrounded by said hollow fiber membranes and extending between and opening through said first and second tubesheets, said inner core member being in fluid communication with said feed gas inlet through the outside of said hollow fiber membranes, and being in fluid communication with the non-permeate product gas outlet through an opening in said first tubesheet and with said hollow fiber lumens through the opening in said second tubesheet;
   (d) a means for securing and sealing said tubesheets to said casing in fluid tight relationship; and
   (e) a fixed orifice positioned in said inner core member to allow a portion of said non-permeate product gas to pass to said permeate side of said hollow fiber membranes.

2. The fluid separation process of claim 1, wherein said hollow fiber membranes are wound around said inner core member.

3. The fluid separation process of claim 1 wherein said assembly is configured such that said portion of that said nonpermeate product gas that is passed on said permeate side of said hollow fiber membrane is a sweep gas that flows in a direction that is essentially countercurrent to the direction of flow of the feed gas.

4. The fluid separation process of claim 3 wherein the sweep gas flow is from 1% to about 80% of said permeate product gas.

5. The fluid separation process of claim 4, wherein the flow of said sweep gas is from 5% to 60% of the flow rate of said permeate product gas.

6. The fluid separation process of claim 1 wherein the product gas outlet and the permeate gas outlet are located at the same end of said casing.

7. The fluid separation process of claim 1, wherein said assembly further comprises a valve positioned within said fixed orifice, and wherein said valve operates such that when product gas is withdrawn from said assembly said valve is open, and when product gas is not withdrawn from said assembly, said valve is substantially closed.

8. The fluid separation process of claim 7, wherein when said valve is substantially closed, the flow of said sweep gas is less than 20% of what said flow would be when said valve is open.

9. The fluid separation process of claim 8, wherein said valve is substantially closed, the flow of said sweep gas is less than 5% of what said flow would be when open.

10. The fluid separation process of claim 7, wherein said valve configured such that flow of sweep gas through said valve is directly proportional to the amount of product gas withdrawn from said assembly.

11. The fluid separation process of claim 1, wherein said feed gas is natural gas.

12. The fluid separation process of claim 11, wherein said permeate gas is water vapor, and said non-permeate product gas is dehydrated natural gas.

13. The fluid separation process of claim 1, wherein said feed gas is air.

14. The fluid separation process of claim 13, wherein said permeate gas is water vapor and said non-permeate product gas is dehydrated air.

15. A membrane gas separation assembly comprising:
   (a) a casing having a feed gas inlet a non-permeate product gas outlet and a permeate gas outlet;
   (b) a multiplicity of hollow fiber membranes having permeate and non-permeate sides arranged longitudinally in said casing, the lumens of said hollow fiber membranes being in fluid communication with the permeate gas outlet and the non-permeate product gas outlet, and the outside of said hollow fiber membranes being in fluid communication with said feed gas inlet, said hollow fibers being positioned in the casing extending from a first tubesheet near the product gas outlet to a second tubesheet at the opposite end of said casing;

(c) an inner core member surrounded by said hollow fiber membranes and extending between and opening through said first and second tubesheets, said inner core member being in fluid communication with said feed gas inlet through the outside of said hollow fiber membranes, and being in fluid communication with the non-permeate product gas outlet through an opening in said first tubesheet and with said hollow fiber lumens through the opening in said second tubesheet;

(d) a means for securing and sealing said tubesheets to said casing in fluid tight relationship; and (e) a fixed orifice positioned in said inner core member to allow a portion of the non-permeate product gas to pass to said permeate side of said hollow fiber membranes.

16. The fluid separation assembly of claim 15 wherein said hollow fiber membranes are wound around said inner core member.

17. The fluid separation assembly of claim 15 wherein said assembly is configured such that said portion of that said non-permeate product gas that is passed on said permeate side of said hollow fiber membrane is a sweep gas that flows in a direction that is essentially countercurrent to the direction of flow of the feed gas.

18. The fluid separation assembly of claim 15 wherein the product gas outlet and the permeate gas outlet are located at the same end of said casing.

19. The fluid separation assembly of claim 15 further comprising a valve positioned within said fixed orifice, and wherein said valve operates such that when said non-permeate product gas is withdrawn from said assembly said valve is open, and when said non-permeate product gas is not withdrawn from said assembly, said valve is substantially closed.

20. The fluid separation assembly of claim 19, wherein when said valve is substantially closed, the flow of said sweep gas is less than 20% of what said flow would be when said valve is open.

21. The fluid separation assembly of claim 19, wherein when said valve is substantially closed, the flow of said sweep gas is less than 5% of what said flow would be when said valve is open.

22. The fluid separation assembly of claim 19, wherein said valve is configured such that the flow of sweep gas through said valve is directly proportional to the amount of product gas withdrawn from said assembly.

* * * * *